(12) United States Patent
Rennó et al.

(10) Patent No.: US 10,508,952 B1
(45) Date of Patent: Dec. 17, 2019

(54) OPTIMUM SPECTRAL BANDS FOR ACTIVE VISION SYSTEMS

(71) Applicant: The Regents of The University of Michigan, Ann Arbor, MI (US)

(72) Inventors: Nilton O. Rennó, Ann Arbor, MI (US); Keith C. Hughes, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 16/176,295

(22) Filed: Oct. 31, 2018

(51) Int. Cl.
| | |
|---|---|
| G08B 19/02 | (2006.01) |
| G01J 3/28 | (2006.01) |
| G06K 9/00 | (2006.01) |
| G01W 1/17 | (2006.01) |
| G06K 9/20 | (2006.01) |
| G01S 17/93 | (2006.01) |

(52) U.S. Cl.
CPC ........... G01J 3/2823 (2013.01); G01S 17/936 (2013.01); G01W 1/17 (2013.01); G06K 9/00805 (2013.01); G06K 9/2018 (2013.01); G08B 19/02 (2013.01)

(58) Field of Classification Search
CPC .... G08B 19/02; G01S 17/936; G06K 9/2018; G06K 9/00805; G01W 1/02; G01W 1/08
See application file for complete search history.

(56) References Cited

U.S. PATENT DOCUMENTS

| | | | |
|---|---|---|---|
| 3,767,915 A | 10/1973 | Battist | |
| 3,970,428 A | 7/1976 | Barringer | |
| 4,054,255 A | 10/1977 | Magenheim | |
| 4,221,482 A | 9/1980 | Macourt | |
| 4,274,091 A | 6/1981 | Decker | |
| 4,441,363 A | 4/1984 | Hill et al. | |
| 4,463,252 A | 7/1984 | Brennan et al. | |
| 4,804,849 A | 2/1989 | Booth et al. | |
| 4,809,197 A | 2/1989 | Tashiro et al. | |
| 4,819,480 A | 4/1989 | Sabin | |
| 4,920,263 A | 4/1990 | Fimian et al. | |

(Continued)

FOREIGN PATENT DOCUMENTS

| | | |
|---|---|---|
| EP | 0537206 B1 | 1/1996 |
| EP | 1401707 A1 | 3/2004 |

(Continued)

OTHER PUBLICATIONS

Nakauchi, S., K Nishino, T. Yamashita, "Selection of Optimal Combinations of Band-Pass Filters for Ice Detection by Hyperspectral Imaging," Opt. Express 20, 986-1000 (2012).

(Continued)

*Primary Examiner* — David P Porta
*Assistant Examiner* — Fani Boosalis
(74) *Attorney, Agent, or Firm* — Harness, Dickey & Pierce, P.L.C.

(57) ABSTRACT

A vision system for monitoring areas of interest having a system for receiving an optical input, outputting a signal, and processing the signal. The system is configured to measure the radiance in spectral bands in which solar radiation is reduced substantially due to absorption by atmospheric constituents. This mitigates the negative effects of solar radiation such as sun glare. The system is configured to output a resultant detection signal in response to the measurements in the spectral bands selected.

19 Claims, 6 Drawing Sheets

(56) References Cited

U.S. PATENT DOCUMENTS

| | | | |
|---|---|---|---|
| 4,965,573 | A | 10/1990 | Gallagher et al. |
| 4,984,163 | A | 1/1991 | Kuwana et al. |
| 5,005,015 | A | 4/1991 | Dehn et al. |
| 5,028,929 | A | 7/1991 | Sand et al. |
| 5,035,472 | A | 7/1991 | Hansen |
| 5,124,914 | A | 6/1992 | Grangeat |
| 5,218,206 | A | 6/1993 | Schmitt et al. |
| 5,301,905 | A | 4/1994 | Blaha |
| 5,313,202 | A | 5/1994 | Hansman, Jr. et al. |
| 5,497,100 | A | 3/1996 | Reiser et al. |
| 5,521,594 | A | 5/1996 | Fukushima |
| 5,596,320 | A | 1/1997 | Barnes |
| 5,695,155 | A | 12/1997 | Macdonald et al. |
| 5,796,344 | A | 8/1998 | Mann et al. |
| 5,818,339 | A | 10/1998 | Giles et al. |
| 5,905,570 | A | 5/1999 | White et al. |
| 6,040,916 | A | 3/2000 | Griesinger |
| 6,091,335 | A | 7/2000 | Breda et al. |
| 6,161,075 | A | 12/2000 | Cohen |
| 6,166,645 | A | 12/2000 | Blaney |
| 6,166,657 | A | 12/2000 | Mann |
| 6,269,320 | B1 | 7/2001 | Otto |
| 6,384,611 | B1 | 5/2002 | Wallace et al. |
| 6,430,996 | B1 | 8/2002 | Anderson et al. |
| 6,459,083 | B1 | 10/2002 | Finkele et al. |
| 6,819,265 | B2 | 11/2004 | Jamieson et al. |
| 6,921,898 | B1 | 7/2005 | Chen |
| 6,977,597 | B2 | 12/2005 | Doherty |
| 7,100,427 | B2 | 9/2006 | Kahn et al. |
| 7,104,502 | B2 | 9/2006 | Otto et al. |
| 7,119,891 | B2 | 10/2006 | White et al. |
| 7,224,453 | B2 | 5/2007 | Elman |
| 7,265,846 | B2 | 9/2007 | Forsyth |
| 7,301,478 | B1 | 11/2007 | Chinn et al. |
| 7,370,525 | B1 | 5/2008 | Zhao et al. |
| 7,424,399 | B2 | 9/2008 | Kahn et al. |
| 7,796,833 | B2 | 9/2010 | Polonskiy et al. |
| 7,839,301 | B2 | 11/2010 | Doherty et al. |
| 7,986,408 | B2 | 7/2011 | Ray et al. |
| 8,000,847 | B2 | 8/2011 | Shue |
| 8,044,823 | B2 | 10/2011 | Doherty et al. |
| 8,325,338 | B1 | 12/2012 | Pope et al. |
| 8,350,910 | B2 | 1/2013 | Capello et al. |
| 8,666,570 | B1 | 3/2014 | Tillotson |
| 8,711,008 | B2 | 4/2014 | Cook et al. |
| 8,796,627 | B2 | 8/2014 | Rockwell et al. |
| 8,854,464 | B2 | 10/2014 | Ishi et al. |
| 9,013,332 | B2 | 4/2015 | Meis |
| 9,041,926 | B2 | 5/2015 | Ray et al. |
| 9,297,755 | B2 | 3/2016 | Renno |
| 9,302,777 | B2 | 4/2016 | Renno |
| 9,304,081 | B2 | 4/2016 | Renno |
| 9,305,220 | B2 | 4/2016 | Funayama et al. |
| 2002/0162962 | A1 | 11/2002 | Rudolph |
| 2003/0150992 | A1 | 8/2003 | Chavez et al. |
| 2003/0169186 | A1 | 9/2003 | Vopat |
| 2004/0036630 | A1 | 2/2004 | Jamieson et al. |
| 2004/0206854 | A1 | 10/2004 | Shah et al. |
| 2004/0231410 | A1 | 11/2004 | Bernard et al. |
| 2005/0002435 | A1 | 1/2005 | Hashimoto et al. |
| 2005/0100336 | A1 | 5/2005 | Mendenhall et al. |
| 2005/0105103 | A1 | 5/2005 | Schietinger et al. |
| 2005/0151965 | A1 | 7/2005 | Bissett et al. |
| 2005/0167593 | A1 | 8/2005 | Forsyth |
| 2005/0218268 | A1 | 10/2005 | Otto et al. |
| 2005/0230553 | A1 | 10/2005 | Otto et al. |
| 2006/0050270 | A1 | 3/2006 | Elman |
| 2006/0261975 | A1 | 11/2006 | Fridthjof |
| 2007/0074415 | A1 | 4/2007 | Gagnon |
| 2008/0110254 | A1 | 5/2008 | Zhao et al. |
| 2008/0129541 | A1 | 6/2008 | Lu et al. |
| 2008/0161878 | A1 | 7/2008 | Tehrani et al. |
| 2008/0218385 | A1 | 9/2008 | Cook et al. |
| 2009/0222238 | A1 | 9/2009 | Gagnon |
| 2009/0261811 | A1 | 10/2009 | Gordon |
| 2010/0072367 | A1 | 3/2010 | Meurer |
| 2010/0085175 | A1 | 4/2010 | Fridthjof |
| 2010/0110431 | A1 | 5/2010 | Ray et al. |
| 2010/0131203 | A1 | 5/2010 | Lilie et al. |
| 2011/0019188 | A1 | 1/2011 | Ray et al. |
| 2011/0135197 | A1 | 6/2011 | Paris et al. |
| 2011/0213554 | A1 | 9/2011 | Archibald et al. |
| 2012/0085868 | A1 | 4/2012 | Barnes |
| 2012/0123637 | A1 | 5/2012 | Funayama et al. |
| 2012/0140233 | A1 | 6/2012 | Rockwell et al. |
| 2012/0182544 | A1 | 7/2012 | Asahara et al. |
| 2012/0187301 | A1 | 7/2012 | Markson |
| 2012/0191350 | A1 | 7/2012 | Prata et al. |
| 2012/0193477 | A1 | 8/2012 | Thorez et al. |
| 2012/0266669 | A1 | 10/2012 | Sage |
| 2012/0274938 | A1 | 11/2012 | Ray |
| 2012/0327410 | A1 | 12/2012 | Maston |
| 2013/0008174 | A1 | 1/2013 | Gould et al. |
| 2013/0234884 | A1 | 9/2013 | Bunch et al. |
| 2013/0249701 | A1 | 9/2013 | Zhang |
| 2014/0112537 | A1 | 4/2014 | Frank et al. |
| 2014/0347189 | A1 | 11/2014 | Weksler et al. |
| 2014/0372069 | A1 | 12/2014 | Nuzzio |
| 2015/0019185 | A1 | 1/2015 | Cunningham et al. |
| 2015/0120092 | A1 | 4/2015 | Renno |
| 2015/0120093 | A1 | 4/2015 | Renno |
| 2015/0170485 | A1 | 6/2015 | DeCusatis et al. |
| 2017/0197728 | A1 | 7/2017 | Renno |
| 2018/0056854 | A1* | 3/2018 | Kunii ................... H04N 9/3185 |

FOREIGN PATENT DOCUMENTS

| | | |
|---|---|---|
| EP | 2637045 A2 | 9/2013 |
| JP | 2001-099710 A | 4/2001 |
| JP | 2006046936 A | 2/2006 |
| JP | 2009115498 A | 5/2009 |
| JP | 4492883 B2 | 6/2010 |
| WO | 2014132073 A1 | 9/2014 |
| WO | 2015116873 A2 | 8/2015 |
| WO | 2016000666 A1 | 1/2016 |

OTHER PUBLICATIONS

Gregoris, D., S. Yu, and F. Teti, "Multispectral Imaging of Ice," Paper Presented at the Canadian Conference on Electrical nd Computer Engineering, 4, 2051-2056.

Jonsson, P, Remote Sensor for Winter Road Surface Status Detection. In: Proceedings of IEEE Sensors (2011) p. 1285-8.

Kou, L., Labile, D., and Chylek, P., "Refractive indices of water and ice in the 0.65- to 2.5µm spectral range", (Jul. 1993), Appl. Opt., 32(19), 3531-3540.

Vanderlei Martins, J., et al., "Remote sensing the vertical profile of cloud droplet effective radius, thermodynamic phase, and temperature", (Mar. 2007), Atmos. Chem. Phys. Discuss., 7, 4481-4519.

Rennó, N. O., et al., "CHASER: An Innovative Satellite Mission Concept to Measure the Effects of Aerosols on Clouds and Climate", (May 2013), Bull. Amer. Meteor. Soc., 94, 685-694.

International Search Report and Written Opinion, International Application No. PCT/US2014/038003, dated Aug. 14, 2014, 13 pages.

International Search Report and Written Opinion, International Application No. PCT/US2014/047415, dated Nov. 20, 2014, 12 pages.

Zahorowski et al., Vertical Radon-222 Profiles in the Atmospheric Boundary Layer, CAWCR 5th Annual Workshop, Atmospheric Composition Observations and Modelling and the Cape Grim Annual Science Meeting, Nov. 15-17, 2011, Bureau of Meteorology, Melbourne, Australia.

Turekian et al., Geochemistry of Atmospheric Radon and Radon Products, Annual Review of Earth and Planetary Sciences, 1977, vol. 5, pp. 227-255.

Jacob and Prather, Radon-222 as a Test of Convective Transport in a General Circulation Model, Tellus (1990), 42B, pp. 118-134.

Mason, Engine Power Loss in Ice Crystal Conditions, Aero Quarterly, 2007.

(56) References Cited

OTHER PUBLICATIONS

Guffanti et al., Encounters of Aircraft with Volcanic Ash Clouds: a Compilation of Known Incidents, 1953-2009, U.S. Department of the Interior, U.S. Geological Survey, Data Series 545, Version 1.0, 2010, Reston, Virginia, U.S.A.

Li et al., A Three-Dimensional Global Episodic Tracer Transport Model: 1. Evaluation of its Transport Processes by Radon 222 Simulations, Journal of Geophysical Research, vol. 101, No. D20, pp. 25,931-25,947, Nov. 20, 1996.

Kritz et al., Radon Measurements in the Lower Tropical Stratosphere: Evidence for Rapid Vertical Transport and Dehydration of Tropospheric Air, Journal of Geophysical Research, vol. 98, No. D5, pp. 8725-8736, May 20, 1993.

Lambert et al., Volcanic Output of Long-Lived Radon Daughters, Journal of Geophysical Research, vol. 87, No. C13, pp. 11,103-11,108, Dec. 20, 1982.

Schery, An Estimate of the Global Distribution of Radon Emissions from the Ocean, Geophysical Research Letters, vol. 31, Oct. 7, 2004.

Williams et al., The Vertical Distribution of Radon in Clear and Cloudy Daytime Terrestial Boundary Layers, Journey of Atmospheric Sciences, vol. 68, pp. 155-174, Jan. 2011.

Moore et al., 222Rn, 210 Pb, 210Bi, and 210Po Profiles and Aerosol Residence Times Versus Altitude, Journal of Geophysical Research, vol. 78, No. 30, Oct. 20, 1973.

Martins et al., Remote Sensing the Vertical Profile of Cloud Droplet Effective Radius, Thermodynamic Phase, and Temperature, Atmospheric Chemistry and Physics Discussions, 7, 4481-4519, 2007.

Kendra, J. R., Ulaby, F. T., & Sarabandi, K. (1994). Snow probe for in situ determination of wetness and density. Geoscience and Remote Sensing, IEEE Transactions on Geoscience and Remote Sensing, 32 (6), 1152-1159.

Sarabandi, K., & Li, E. S. (1997). Microstrip ring resonator for soil moisture measurements. Geoscience and Remote Sensing, IEEE Transactions on Geoscience and Remote Sensing, 35 (5), 1223-1231.

Dionigi, M., Ocera, A., Fratticcioli, E., and Sorrentino, R. (2004), A new resonant probe for Dielectric permittivity measurement, European Micro. Conf. Dig., Amsterdam, 673-676.

Fratticcioli, E., M. Dionigi, and R. Sorrentino (2004), "A simple and low-cost measurement system for the complex permittivity characterization of materials," IEEE Trans. on Instrumentation and Measurement, 53(4), 1071-1077.

Sagnard, F. and Y.-L. Beck (2009), "Experimental study of the influence of moisture and dry density on a silt soil using a monopole probe," Micro and Optical Tech. Lett., 51(3), 820-826.

Chang, K., & Hsieh, L. H. (2004), Microwave Ring Circuits and Related Structures, Second Edition, John Wiley & Sons, Inc.

International Search Report and Written Opinion, International Application No. PCT/US2014/061949, dated Feb. 9, 2015, 9 pages.

International Search Report and Written Opinion of the International Searching Authority dated Apr. 21, 2017 regarding PCT/US2017/012410.

* cited by examiner

| Temperature (°C) | Road Condition | Braking, Traction and Directional Control | Reporting Code | Coefficient of Friction μ (%) |
|---|---|---|---|---|
| Any | Dry | Good traction, braking and directional control | 6 | μ >> 40 |
| T ≤ -15 C° | Frost<br>Dry Snow<br>Wet<br>Wet Snow<br>Slush | Traction, braking and directional control is between good and medium | 5 | μ ≥ 40 |
| T > -15 C° | Frost<br>Dry Snow<br>Wet<br>Wet Snow<br>Slush | Traction, braking and directional control is medium | 4 | 40 < μ ≤ 30 |
| | Thick Water Layer<br>Thick Slush Layer | Traction, braking and directional control is between medium and poor | 3 | 30 < μ ≤ 20 |
| Any | Ice | Traction, braking and directional control is poor | 2 | 30 < μ ≤ 20 |
| | Wet Ice<br>Slush & Ice<br>Water & Ice | Traction, braking and directional control is uncertain | 1 | μ < 20 |

Fig 6

OPTIMUM SPECTRAL BANDS FOR ACTIVE VISION SYSTEMS

FIELD

The present disclosure relates to active vision systems and, more particularly, relates to a method for determining optimum spectral bands for active vision systems that operates in one of these optimum spectral bands.

BACKGROUND AND SUMMARY

This section provides background information related to the present disclosure which is not necessarily prior art. This section provides a general summary of the disclosure, and is not a comprehensive disclosure of its full scope or all of its features.

Typically, vision systems monitor a scene using electromagnetic radiation usually from a specific spectral band, such as ultra violet (UV), visible (VIS), near infrared (NIR), short wave infrared (SWIR), and long wave infrared (LWIR) radiation. Together, the NIR and SWIR spectral bands are also referred to as the reflected infrared band (as opposed to the emitted radiation from the thermal infrared band), while the LWIR band is referred to as the thermal infrared band.

Infrared (IR) vision systems are used in numerous civilian and military applications. Some vision systems are designed to observe scenes under extreme low illumination by using light amplification or light intensification technologies, such as the night vision device described in U.S. Pat. No. 4,463,252. Different information about a scene can be conveyed through incoming electromagnetic radiation from the various portions of the spectrum. Indeed, many techniques have been developed by combining multi-spectral images of the scenes of interest. For example, U.S. Pat. No. 5,035,472 describes a device that transmits the signal of an image along two separate paths, one directing the signal towards an IR detector and the other directing the signal towards an image intensifier. Then, the IR and intensified images are combined for displaying the information to the user.

The number of autonomous vehicles in use on public roads and in civilian airspace has been increasing steadily, exposing them to hazardous environmental conditions such as slippery roads and aircraft icing conditions. Therefore, autonomous vehicles will likely be required to have control systems configured to receive information regarding not only the surrounding terrain and the obstacles in their path, but also the conditions of the road and the airspace ahead. In addition, autonomous vehicles will likely need to respond to this information automatically by commanding maneuvers to negotiate terrain, avoid obstacles, and track a particular path in order to avoid potentially hazardous conditions.

Recent accidents involving automobiles employing advanced automation systems have been discussed extensively in the engineering communities and in the media. Accidents frequently occur when vision systems fail due to exposure to intense sunlight (e.g. sun glare). This is a common problem for vision systems that rely on cameras, lidars, or other devices operating in portions of the spectrum strongly affected by sunlight, such as in the visible and near infrared spectral bands.

The principles of the present teachings provide a method for avoiding problems caused by sunlight in devices used for avoiding obstacles, navigating, detecting road conditions (i.e. distinguishing dry roads from wet roads and icy roads, estimating the thickness of water layers), and sensing the atmospheric conditions in the airspace around an aircraft or an autonomous air vehicle (i.e. detecting potentially hazardous icing conditions or volcanic ash ahead). In addition, the present teachings can be used in systems for detecting the concentration of gases leaking from industrial systems or natural atmospheric constituents.

The present teachings provide a method for determining optimum spectral bands for active vision systems used outdoor and a device that employs this method. The method and the device can be used to provide warnings to drivers, to provide information for aircraft, automobile, and autonomous air, and ground or sea vehicles, among other applications.

In some embodiments of the present invention, detectors, detector arrays, or multi-spectral cameras can be used to make the required measurements. A similar system can be used for detecting ice or water unambiguously on aircraft surfaces, manufacturing systems, or any other object of interest. In some embodiments, a system using measurements in a single optimum spectral band, such as a lidar, can be used for obstacle avoidance or navigation.

In some embodiments of the present invention, a road condition monitoring system is provided that is configured to detect water, snow, frost, clear ice, and other types of ices on roads and any other surface of interest. The system is configured to distinguish dry surfaces from those covered by water, snow, frost, and various types of ice even when these substances cover only a fraction of the field of view of the road condition monitoring system.

Water and ice can often be difficult to detect by drivers or current synthetic vision systems. Clear ice is unusually difficult to detect. Aircrafts, cars, trucks, buses, motorcycles, and other vehicles would benefit from systems capable of detecting the presence of ice or water on surfaces, such as roadways, bridges, sidewalks, or even runway and taxiways (i.e. in connection with ground operations of aircrafts or supporting personal and vehicles). The fact that drivers, operators, and synthetic vision systems fail to detect deteriorating road conditions ahead of a vehicle because of sun glare frequently leads to accidents.

Some of the prior art approaches for vision systems designed for navigation and for the detection of ice and water on roads, aircraft surfaces, and in the airspace around them are based on near infrared radiance measurements. However, these prior art techniques are subject to the negative effects of sun glare because they are based on measurements in portions of the spectrum strongly affect by sunlight.

U.S. Patent App. Pub. No. 2008/0129541AI refers to a slippery ice warning system capable of monitoring the road ahead of a vehicle. One or two visible cameras are used to image the same scene at two orthogonal polarizations. When a single camera is used, a polarization beam splitter is used to separate the reflected light into two orthogonal polarizations. The possible (but ambiguous) determination of the existence of slippery ice ahead of the vehicle is detected by measuring the polarization of the reflected light. Moreover, since this system operates in the visible portion of the spectrum it is subject to the negative effects of sun glare.

U.S. Patent App. Pub. No. 2005/0167593A1 refers to a method that uses shifts in the wavelength of the reflectance near 1.4 µm to distinguish water from ice. In this method, liquid water and ice are discriminated from each other by analyzing shifts in the short wavelength edge of the 1.4 µm band reflectance. Detection decisions are based on shifts in wavelengths in a portion of the spectrum strongly affected by sunlight. Unfortunately, systems based on this method are subject to problems caused by sun glare.

A more recent invention described in U.S. Patent App. Pub. No. 20120193477A1 uses effective reflectance defined as the reflectance of a given material at a given wavelength divided by the reflectance of this same material at a wavelength equal to 1.1 μm to determine the measurements bands for distinguishing wet material from that containing ice on its surface. In this technique, the detection signal is the contrast C between the measurements in the first and the second band, where the contrast signal is defined the ratio between the differences in the intensity of radiation in the second and first bands and the sum of the intensities in the two bands. In this technique, detection decisions are based on the contrast signal is spectral bands strongly affected by sunlight. Unfortunately, systems based on this method are also subject to problems caused by sun glare.

U.S. Pat. No. 9,304,081, which is incorporated herein by reference, describes a technique that uses the radiance ratio around a crossover point ($\gamma=R_{\lambda,1}/R_{\lambda,2}$) to monitor the condition of the road or the airspace ahead of a land or air vehicle. The key feature of this technique is that the detection signal is robust because if depends simply on the ratio of the measurements in two nearby narrow spectral bands. However, minimization of the effects of sun glare was not a concern when the technique was developed.

According to the principles of the present teachings, optimum spectral bands are implemented in a system for monitoring potentially hazardous conditions ahead such as water, snow, and ice on roads or runways. The system disclosed herein overcomes the disadvantages of the prior art because it is immune to the negative effects of sun glare. Active vision systems can be designed for navigation and for the detection of potentially hazardous conditions in the airspace or in the surface ahead of a vehicle. Industrial systems for outdoors use can be configured to map the system's surroundings or to distinguish clean surfaces from those covered by ice, snow, oil, water, or other particular substances of interest.

In some embodiments of the present teachings, a light source (i.e. a pulsed laser), multispectral detectors and/or multispectral camera, a data processor unit, and interfaces with displays, safety systems, and/or autonomous systems are employed to provide an indication of the conditions ahead and respond to it.

In some embodiments, the road condition monitoring system of the present teachings contains only a detector pair with filters, a data processor unit, and interfaces to displays and control systems. In some embodiments, a lidar using a laser with wavelengths falling within one of the optimum spectral bands described in this document can be used.

Further areas of applicability will become apparent from the description provided herein. The description and specific examples provided in this summary are for illustration only; they are not intended to limit the scope of the present disclosure.

DRAWINGS

The drawings described herein are for illustrative purposes only of selected embodiments and not all possible implementations, and are not intended to limit the scope of the present disclosure.

FIG. 1 illustrates the solar irradiation spectrum at the top of the atmosphere and near the surface at sea level. Bands in which solar irradiation is strongly absorbed by atmospheric ozone ($O_3$), carbon dioxide ($CO_2$) and water vapor ($H_2O$) are indicated.

FIG. 2 illustrates the main atmospheric absorption bands. These are the optimum spectral bands for active vision systems because they minimize the negative effects of solar radiation, such as sun glare. The spectral bands in which the fraction of the incident solar radiation passing through the atmosphere are lowest, are the best bands for active vision systems for use outdoors.

FIG. 3 illustrates the absorption spectra of water substance and particularly the complex index of refraction of liquid water and ice indicating possible optimum bands for active vision systems (e.g., at approximately <0.3, 0.90-0.95, 1.10-1.15, 1.35-1.50, 1.80-2.06, 2.50-3.05 μm as non-exhaustive examples).

FIG. 4 illustrates the index of refraction of liquid water and ice around the 1.98 μm crossover point. This is an optimum spectral band for active road conditions monitoring capable of distinguishing dry roads, from roads covered by ice, snow, slush, or water. It is also an optimum band for active aircraft icing detection systems capable of monitoring the icing potential of clouds ahead.

FIG. 6 illustrates a road condition assessment matrix relating the detection signal and the road surface temperature with the coefficient of friction between the vehicle's wheels and the road.

Corresponding reference numerals indicate corresponding parts throughout the several views of the drawings.

DETAILED DESCRIPTION

Figure 1:
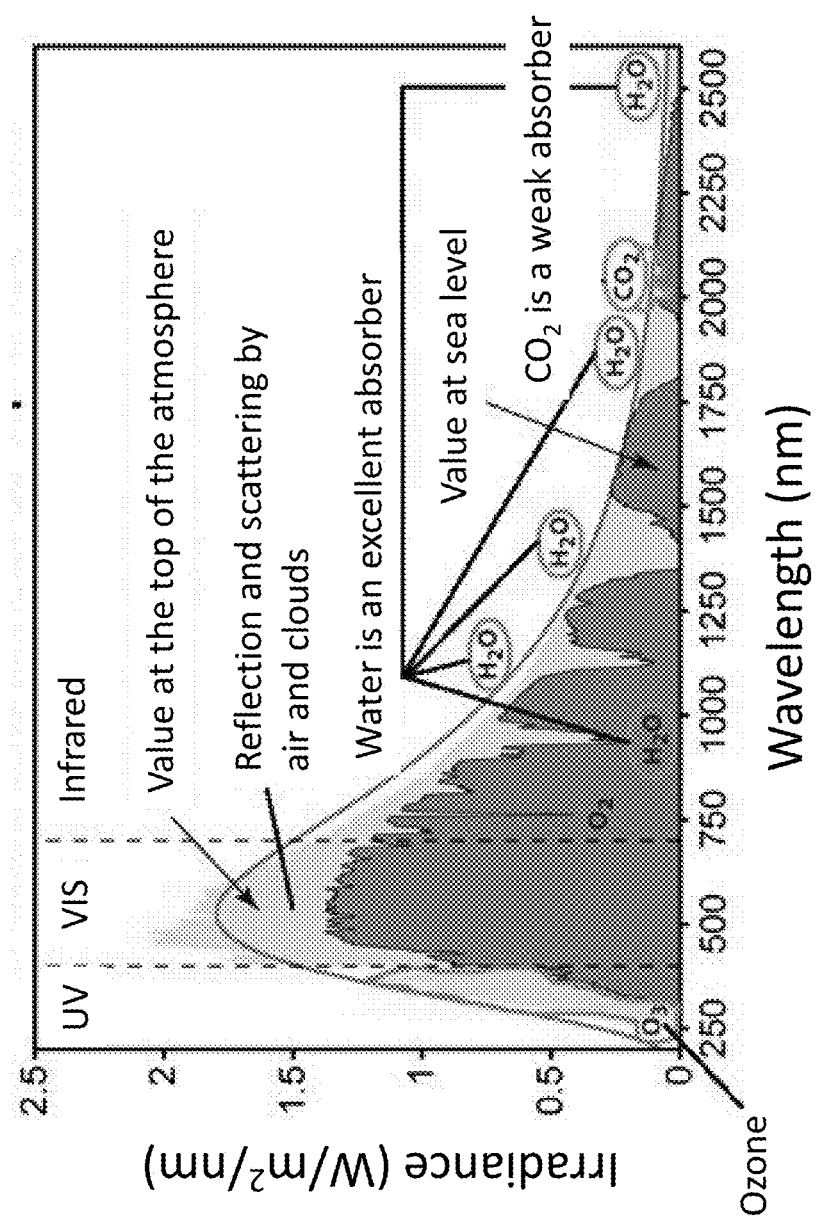

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer, or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
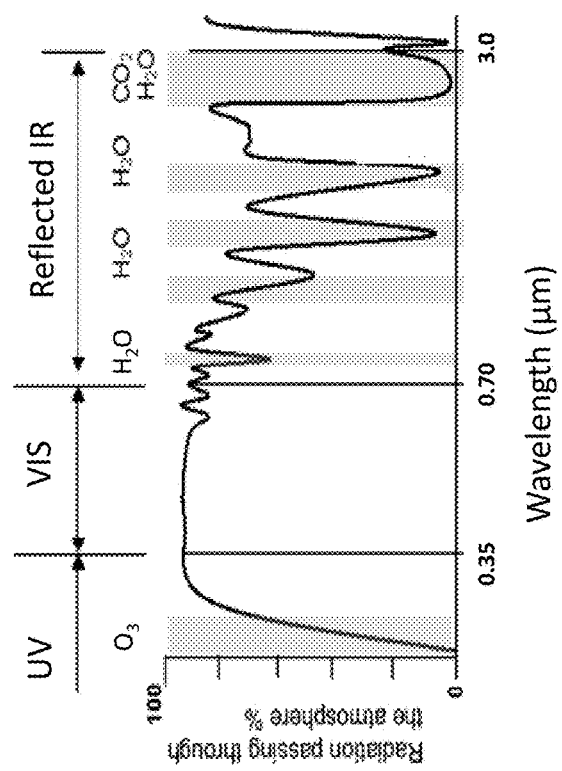

According to the principles of the present teachings, a vision system 10, such as a road condition monitoring system, is provided for detecting road condition and/or for monitoring conditions of interest, such as but not limited to ice detection on aircraft, manufacturing systems, or other objects of interest. The vision system 10 is configured and operable to make measurements in spectral bands in which solar radiation is strongly absorbed by atmospheric constituents (FIGS. 1 and 2), thereby reducing or eliminating the negative effects of sunlight, such as solar glare, on vision system detection. In accordance with the present teachings, the invention will be disclosed in connection with a road condition monitoring system; however, it should be understood that the principles of the present teachings should not be regarded as being limited to only road condition monitoring, but are equally applicable to a wide variety of vision and/or detection systems that are typically negatively influenced by sunlight in any portion of the spectrum or solar glare.

Figure 3:
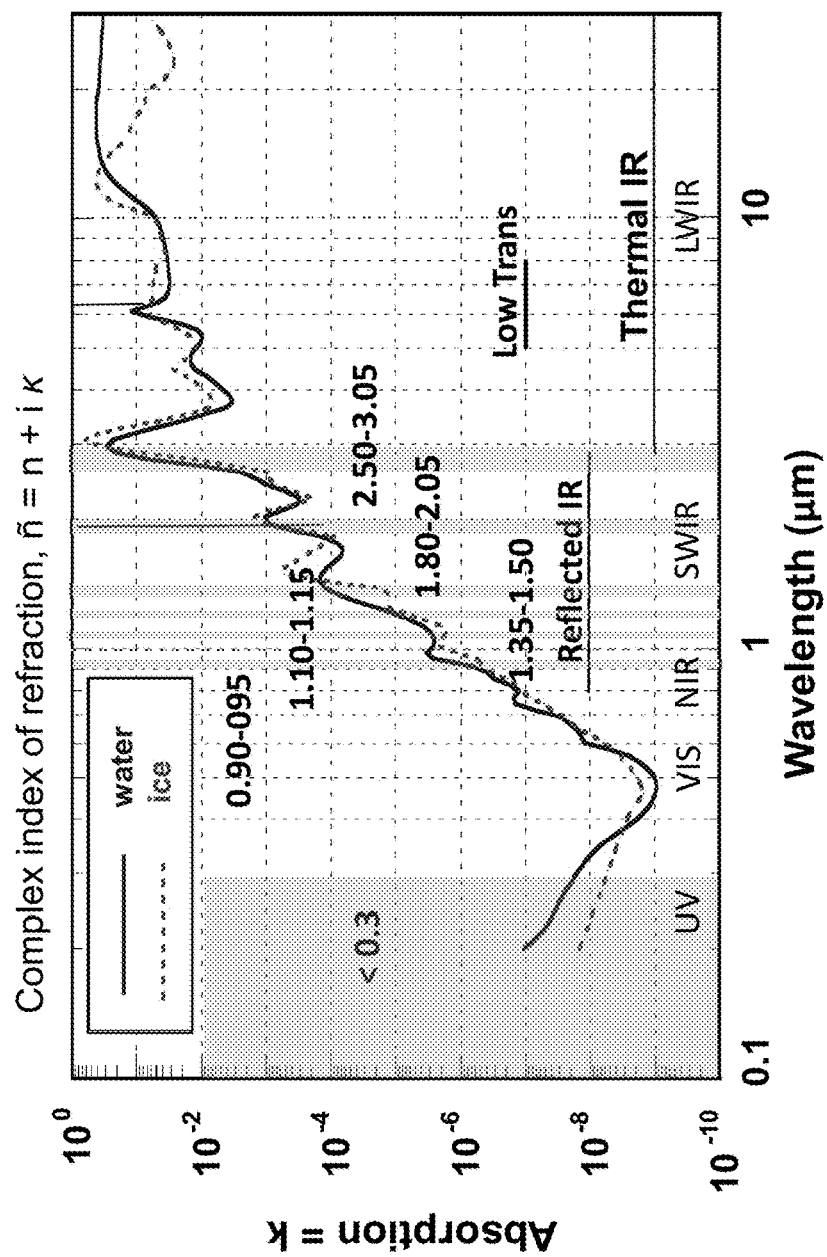
Figure 4:
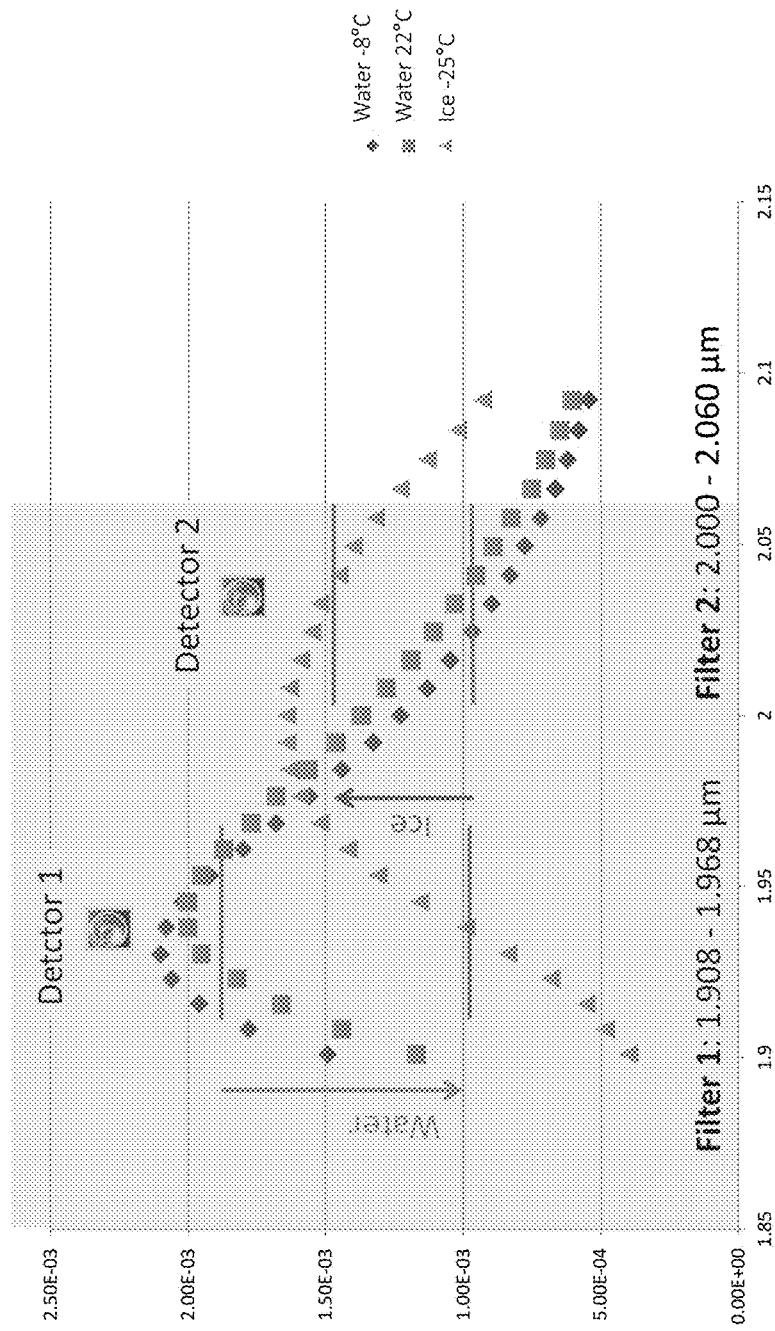

In some embodiments, vision system 10 uses measurements of radiance in at least two narrow spectral bands indicated in FIGS. 3 and 4 to estimate the road condition ahead of the vehicle, for example, at distances in excess of 100 m.

Figure 5:
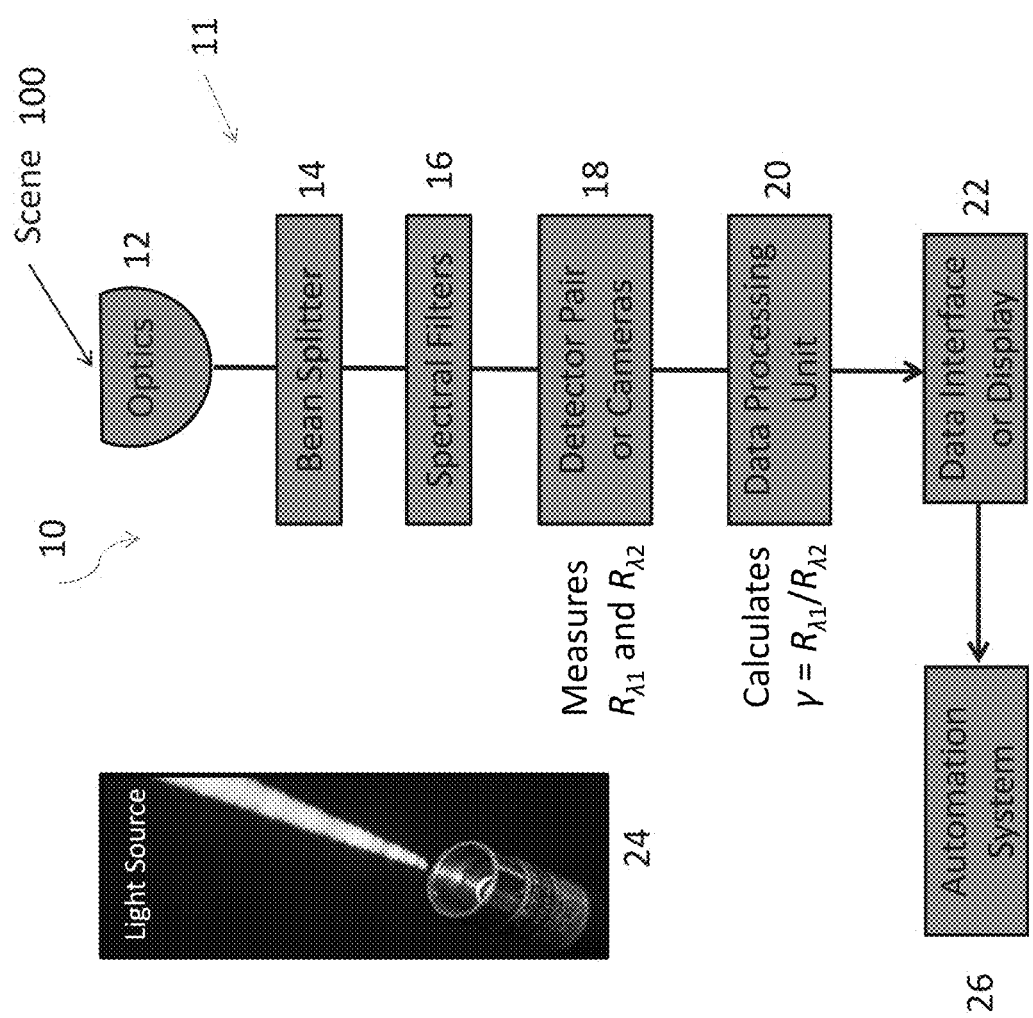
FIG. 5 illustrates a schematic block diagram illustrating a vision system according to the principles of the present teachings.

The vision system 10 illustrated in FIG. 5 is a vision system configured to detect water, snow, frost, clear ice (also referred to as glaze or black ice), and other types of ices on roads or any other surface of interest. Vision system 10 is configured to distinguish dry surfaces from those covered by water, snow, or other types of ice. In some embodiments, vision system 10 monitors the airspace around or ahead of an aircraft for hazardous icing conditions.

With particular reference to FIG. 5, a schematic block diagram illustrating vision system 10 according to the principles of the present teachings. In some embodiments, vision system 10 comprises an optics system 11 having one or more light collection optics 12, an optional beam splitter 14, an optional bandpass or spectral filters 16, and detector pair or cameras 18. The optics system 11 can detect a scene 100 as an optical input and output a resultant optics signal. The radiance of scene 100 can be measured with cameras 18, such as those based on Indium Gallium Arsenide (InGaAs) technology, or with photodetectors, photodiodes, pyroelectric detectors, thermopile detectors, photoconductors, among others.

The vision system 10 can further comprise, a processing unit 20 configured to receive the optics signal from the optics systems and calculate the ratio of the radiance in the two bands in which solar radiation is reduced substantially due to absorption by atmospheric constituents in order to mitigate the negative effects of solar radiation. The processing system 20 is configured to output a resultant signal in response to the measurements in the spectral bands to a display or data interface system 22, in response to light source 24. In some embodiments, light source 24 comprises halogen lights, incandescent lights, or pulsed infrared lasers, or LEDs used to illuminate the area of interest 100. In some embodiments, the area of interest 100 ahead of the vehicle can be illuminated with intense laser beams 24 containing the desired spectrum.

In some embodiments, vision system 10 can comprise an automation system 26 operably coupled to a system of the vehicle for automatically controlling the system of the vehicle in response to an output signal from the data processing unit 20 or data interface 22.

Radiance measurements (instead of reflectance measurements) are sufficient for most practical applications, because the targets can be illuminated with light sources containing relatively small power variations between the spectral bands of interest (e.g., surfaces illuminated by direct or indirect sunlight, or illuminated by a known light source).

As illustrated in FIG. 3, a crossover point occurs in the imaginary part of the index of refraction of liquid water and ice at a wavelength of 1.98 µm. In this band, careful measurements at each side of the crossover point, like in the two bands indicated in FIG. 3 by short horizontal bars move the detection signal of water in the opposite direction to that of snow and ice. The location and width of the first (detector 1) and second (detector 2) bands are selected such that water causes the first band radiance signal and the second band radiance signal to move in opposite direction than for ice.

In some embodiments, the present teachings provide a system that alerts the driver or provides feedback to the vehicle's automation systems. The present system is capable of quantifying the hazards level using road condition assessment matrices such as that illustrated in FIG. 6. This example is analogous to the runway condition assessment matrix developed by the FAA.

In some embodiments, the data processing unit or system 20 is configured to implement an algorithm to detect the presence of water, snow, frost, ice and water/ice mixtures using non-transitory software and look-up tables to estimate the surface condition and output a warning or alert when a predetermined condition is detected based on the radiance measurements in the first band and the second band. By way of non-limiting example, the algorithm for assessing road condition ahead of a vehicle can comprise the following steps:

1. Measurements with optical system 11 containing a pair of detectors 18 or a pixel array with spectral filters 16 are used to measure the radiance of the area of interest 100 (e.g. 100 m ahead of the vehicle).

2. Measurements with a spectral filter that allows radiance in a first band between about 1.908 and 1.968 μm to pass are used to determine the radiance at one side of the crossover point ($R_{1.938\,\mu m}$);

3. Measurements with a spectral filter that allows radiance in a second band between about 2.000 and 2.060 μm to pass are used to determine the radiance at the other side of the crossover point ($R_{2.030\,\mu m}$);

4. The measurements in the first and second band are then used to determine the radiance ratio $\gamma = R_{1.938\,\mu m}/R_{2.030\,\mu m}$ of the area of interest 100;

5. The value of the radiance ratio γ is used to determine the surface or road condition using a road condition assessment matrix defined below;

6. The surface temperature (T) is estimated using measurements by a thermocouple or any other suitable method;

7. The road surface temperature is then used to refine the surface or road condition using a road condition assessment matrix relating the detection signal and the road surface temperature with the coefficient of friction between the vehicle's wheels and the road; and 8. Feedback is provided to the operator or vehicle automation system. In some embodiments, a WARNING is produced when hazardous conditions are detected. The hazard condition can be quantified by a numerical code.

In summary, a road condition monitoring or vision system immune to the negative effects of sun glare is provided. The vision system is capable of measuring the radiance reflected by an area of interest in wavelengths range containing a crossover point between the curves representing the absorption of electromagnetic radiation by ice and water. The detection system measures the radiance in a first band having wavelengths in a spectral band on a first side of the crossover point and outputting a first band signal, and further measures the radiance in a second band having wavelengths in a spectral band on a second opposing side, of the same crossover point and outputting a second band signal. The crossover point and the measurement bands on each side of the crossover point are selected carefully to avoid the negative effects of solar radiation and to provide unambiguous detection of water, snow and various types of ice even when these substances cover a fraction of the field of view of the road condition monitoring system. A processing unit determines the ratio of the first band signal to the second band signal, and compares the ratio to predetermined critical ratios to output the determination signal indicating the presence of water or various types of ice.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An active vision system for monitoring areas of interest, the vision system comprising:
    an illumination source outputting energy to the areas of interest in at least one spectral band in which solar radiation is reduced substantially due to absorption by atmospheric constituents, the at least one spectral band being selected from the group consisting of less than 0.3, 0.90-0.95 μm, 1.10-1.15 μm, 1.35-1.50 μm, 1.80-2.06 μm, and 2.50-3.05 μm;
    an optics system receiving an optical input in the at least one spectral band from the areas of interest and outputting an optics signal; and
    a processing system receiving the optics signal, the processing system configured to measure the optics signal, the processing system configured to output a resultant signal in response to the measurements in the at least one spectral band,
    wherein the optics system comprises at least one detector configured to measure radiance in the at least one spectral band adjacent to a crossover point of the imaginary part of the index of refraction of liquid water and ice, the at least one detector configured to measure the radiance in the first band portion of the at least one spectral band having wavelengths on a first side of the crossover point and output a first band signal, the at least one detector configured to measure the radiance in a second band portion of the at least one spectral band having wavelengths on a second side of the crossover point and output a second band signal, the second side of the crossover point being opposite of the first side; and
    the processing system configured to detect the presence of water, snow, frost, ice, and water/ice mixtures using non-transitory software and look-up tables to estimate the surface condition and output an alert when a predetermined condition is detected based on the radiance measurements in the first band portion and the second band portion.

2. The vision system according to claim 1 wherein the location and width of the first and second band portions of the at least one spectral band are selected such that water causes the first band signal and the second band signal to move in an opposite direction than ice.

3. The vision system according to claim 1, wherein the at least one detector comprises a camera and spectral filters.

4. The vision system according to claim 1, wherein the processing system is configured to quantify a hazard level using a road condition assessment matrix relating the detection signal and a measured temperature with the coefficient of friction between a vehicle's wheels and a road surface.

5. The vision system according to claim 1 comprising:
    an interface system coupled to a display configured to alert an operator.

6. The vision system according to claim 1 comprising:
    an automation system of a vehicle configured to respond to the alert from the processing system.

7. The vision system according to claim 1 comprising:
    an interface system operably coupled to a vehicle, the interface system configured to prevent unsafe vehicle driving configurations by reducing a vehicle speed or deviating from a hazard in response to the alert.

8. The vision system according to claim 1,
    wherein the atmospheric constituents are chosen from the group consistently of atmospheric ozone ($O_3$), carbon dioxide ($CO_2$), and water vapor ($H_2O$).

9. The vision system according to claim 1, wherein the first band portion is about 1.908 to 1.968 μm and the second band portion is about 2.000 to 2.060 μm.

10. A vision system for detecting the condition of the road ahead of a vehicle, the condition of the airspace ahead of a vehicle, or obstacles, or for mapping terrain, navigating, or for detecting surface or atmospheric constituents of interest, and the system comprising:
- a measurement system configured to measure in spectral bands in which solar radiation is reduced substantially because of absorption by atmospheric constituents in order to mitigate the negative effects of solar radiation and output a determination signal.

11. The vision system according to claim 10, wherein the measurement system comprises a camera detector.

12. The vision system according to claim 10, wherein the measurement system comprises a light source configured to illuminate an area of interest.

13. The vision system according to claim 10 comprising:
- an interface system coupled to a display configured to alert an operator.

14. The vision system according to claim 10 comprising:
- an automation system of a vehicle configured to respond to the alert from the processing system.

15. The vision system according to claim 10 comprising:
- an interface system operably coupled to a vehicle, the interface system configured to prevent unsafe vehicle driving configurations by reducing a vehicle speed or deviating from a hazard in response to the alert.

16. A detection method for detecting an obstacle, a surface, or constituents of interest, the method comprising:
- measuring a determination signal in spectral bands in which solar radiation is reduced substantially because of absorption by atmospheric constituents in order to mitigate negative effects of solar radiation such as sun glare.

17. The detection method according to claim 16 wherein:
- radiance is measured in a first band portion and a second band portion adjacent to a crossover point of the imaginary part of the index of refraction of liquid water and ice and outputting a first band signal and a second band signal respectively, the radiance in the first band portion having wavelengths in a spectral band on a first side of the crossover point and in the second band portion having wavelengths in a spectral band on a second opposing side of the crossover point; and
- the ratio of the first band signal to the second band signal is determined and the ratio is compared to predetermined critical ratios to output a determination signal indicating the presence of water or ice.

18. The detection method according to claim 17 wherein the location and width of the first band portion and the second band portion are adjusted such that water pushes the first band signal and the second band signal in the opposite direction than ice.

19. The detection method according to claim 16, wherein the spectral bands are about 1.908 to 1.968 μm and about 2.000 to 2.060 μm.

* * * * *